United States Patent [19]
Schwert et al.

[11] Patent Number: 5,271,433
[45] Date of Patent: Dec. 21, 1993

[54] HOSE FOR LINING PRESSURE PIPE LINES

[76] Inventors: Siegfried Schwert, Nieritzstrasse 11, D-1000 Berlin 37, Fed. Rep. of Germany; Franz-Xaver Huemer, Sonnenuhrgasse 4, A-1060 Vienna, Austria

[21] Appl. No.: 873,394

[22] Filed: Apr. 24, 1992

[30] Foreign Application Priority Data

Apr. 24, 1991 [DE] Fed. Rep. of Germany ....... 4113378

[51] Int. Cl.⁵ ............... F16L 55/16; B29C 27/16
[52] U.S. Cl. ..................... 138/98; 138/124; 156/287; 264/269
[58] Field of Search ............... 138/97, 98, 123, 124, 138/125, 126; 156/287; 264/36, 269; 405/150.1, 154

[56] References Cited

U.S. PATENT DOCUMENTS

| | | | |
|---|---|---|---|
| 4,334,943 | 6/1982 | Zenbayashi et al. | 138/98 |
| 4,576,205 | 3/1986 | Morinaga et al. | 138/98 |
| 4,600,615 | 7/1986 | Hyodo et al. | 138/97 |
| 4,684,556 | 8/1987 | Ohtsuga et al. | 138/97 |
| 4,686,126 | 8/1987 | Hyodo et al. | 138/97 |
| 4,861,634 | 8/1989 | Renaud | 156/287 |

FOREIGN PATENT DOCUMENTS

| | | |
|---|---|---|
| 73952 | 7/1966 | Canada ............... 156/287 |
| 3505107 | 10/1988 | Fed. Rep. of Germany . |
| 3414531 | 7/1990 | Fed. Rep. of Germany . |

*Primary Examiner*—James E. Bryant, III
*Attorney, Agent, or Firm*—Basile and Hanlon

[57] ABSTRACT

A hose for lining pressure pipe lines is described comprising a web being made up of warp and woof threads, which are made of plastic, as well as a coating of thermoplastic material, which coating is impermeable to the medium to be transported in the pipe lines and is applied onto one side of the web. Due to the pressure of a fluid, the hose is introduced into a pipe line and turned up therewith, in which case a cement in the interior of the hose prior to turning-up will come between the outside of the hose and the inside wall of the pipe line. In order to, on the one hand, obtain high strength in the longitudinal direction and to, on the other hand, facilitate introduction of the hose into the pipe line, the stretching ability of the web, in the transverse direction of the hose, is greater by at least one third as compared to that in its longitudinal direction and, preferably, is at least twice as great. In the web, the proportion of the warp threads, advantageously, is >65 percent by weight and the proportion of the woof threads, advantageously, is <35 percent by weight. Furthermore, the warp threads may be smooth and the woof threads may be slightly textured, Preferably, a type of web is chosen with which the incorporation for the warp threads will be <2 percent and for the woof threads will be >12 percent.

12 Claims, 1 Drawing Sheet

HOSE FOR LINING PRESSURE PIPE LINES

BACKGROUND OF THE INVENTION

1. Field of the Invention

The present invention relates to a hose for lining pressure pipe lines.

2. Description of Related Art

From German Printed Publication 34 14 531 C3, a lining material in the form of a hose and destined for pipe lines has become known. The lining material includes a textile shell of warp threads and woof threads, which is provided with a coating made from a flexible synthetic resin. The lining material is, together with a cement on its inner surface, introduced into a pipe line and moved in forward direction inside the pipe line, in which case it will be turned over under the influence of a pressure medium so that the cement comes between the lining material and the inside wall of the pipe line. In order to enable adaptation of the lining material to pipe lines of relatively small internal diameter and sharper curvatures, warp threads of an elastic yarn are used, with a synthetic yarn or synthetic yarns being wound around the same over its entire length. Hereby, a high stretching ability in the longitudinal direction is obtained so that, e.g., formation of creases in the region of the curvatures is avoided. The woof threads may also consist of an elastic yarn, a synthetic yarn being wound around in the same manner over its entire length. Hereby, a good adaptation to varying internal diameters of the pipe lines is made possible.

In German Printed Publication 35 05 107 C2, the aforementioned lining material is described as being disadvantageous since it requires an elastic polyurethane yarn which is relatively expensive and which is not suited for larger hose diameters. In order to enable the use of such a lining material in pipe lines of sharper curvatures and of relatively large internal diameters, it, therefore, is suggested to make the warp threads from rippled yarns of polybutylene terephthalate fibers and the woof threads from a yarn of synthetic fibers, in which case the woof threads, possibly, likewise consist of rippled yarn.

Such linings in the form of hoses and destined for pipe lines must usually be of great strength in the longitudinal direction. Only in the longitudinal direction are the pipe lines commonly subjected to high mechanical strains, e.g., by weighing-down of the ground in which the pipe lines ar buried. In contrast thereto, the hoses produced with a specific undersized diameter, as compared to the pipe lines, must, in a transverse direction, radially expand and bear on the inside wall of the pipe under an internal pressure. The internal pressure which is maintained until setting of the cement shall, therewith, be as low as possible in order that the cement not be squeezed into lateral pipe outlets whereby, on the one hand, bonding of the lining to the pipe inside wall is affected and, on the other hand, subterranean gating of the pipe outlets, i.e., tapping the outlets out of the pipe line, is rendered more difficult or even impossible. Furthermore, the turn-over operation has to be carried out such that the risk of damaging the lining is small and that, moreover, only a low transport pressure is required, whereby the operation can be better controlled.

SUMMARY OF THE INVENTION

Thus, it is the object of the present invention to provide a hose for lining pressure pipe lines comprising a web being made up of warp and woof threads, which are made of plastic, as well as a coating of thermoplastic material, which coating is impermeable to the medium to be transported in the pipe lines and is applied onto one side of the web. The hose, due to the pressure of a fluid, is introduced into a pipe line and turned up therewith, in which case a cement in the interior of the hose will prior to turning-up, come between the outside of the hose and the inside wall of the pipe line. The cement, in a set condition, tightly holds the hose to the pipe line. The hose, in a longitudinal direction, is of great strength and necessitates but a slight stationary pressure during setting of the cement as well as, moreover, only a slight transport pressure upon introducing the hose into the pipe line.

The fact that the stretching ability of the web, in the transverse direction of the hose, is greater by at least one third, as compared to that in its longitudinal direction, and, preferably, at least twice as great, enables a relationship among the mechanical properties of the hose to be obtained such that it will optimally meet the requirements with regard to great strength in operation on the one hand and with regard to easy introduction on the other hand.

In the web, the proportion of the warp threads, preferably, is >65 percent by weight and the proportion of the woof threads, preferably, is <35 percent by weight; whereby, the web material is substantially concentrated upon the warp threads so that, as compared to the material as a whole, a large cross-sectional area and, therefore, a corresponding longitudinal strength will result. The material extending in the transverse direction shows, in contrast thereto, a remarkably smaller cross sectional area so that, for the same stretching, relatively weak forces are required.

Advantageously, the warp threads are smooth and the woof threads are slightly textured. The slight shrinking of the woof threads, resulting from the texturing, considerably enhances their stretching ability.

Furthermore, a type of web is, preferably chosen, where incorporation for the warp threads is <2 percent and, for the woof threads, is >12 percent. Incorporation, here, is meant to be the excess of the length of a thread worked into the web over the corresponding length of the latter. The high incorporation of the woof threads substantially results from the fact that, between every two crossing points of the woof threads, two or more warp threads are placed, whereas the woof threads themselves are each placed over and under the warp threads in an alternating manner.

Hereby, the woof threads extend around the warp threads in an undulatory manner, whereas the warp threads are substantially linear.

The tensile strength of the warp threads should be chosen so as to be as high as possible and not be in excess of $500 \cdot 10^3$ N·m./kg. (5.6 g./den), whereas the breaking strength, in case of the woof threads, should be lower for the purpose of attaining a better stretching ability and should not exceed $442 \cdot 10^3$ N·m./kg. (5g./den).

Good stretching ability in the transverse direction will also result in the formation of shallow, outwardly directed troughs in the lining hose in the region of pipe outlets. These troughs can be readily recognized from the inside on the occasion of a subsequent optical scanning of the lining, e.g., when passing through a camera, so that the tapping instrument for opening the outlet can be appropriately positioned in the pipe line.

Due to the good stretching ability of the hose in the transverse direction, it will also follow curvatures of the pipe line without forming creases, e.g., curvatures of 90 degrees with a radius corresponding to three times the pipe diameter.

BRIEF DESCRIPTION OF THE DRAWING

In the following, the invention will be explained in more detail, taken in conjunction with one embodiment illustrated in the figures in which.

DESCRIPTION OF THE PREFERRED EMBODIMENTS

Figure 1:
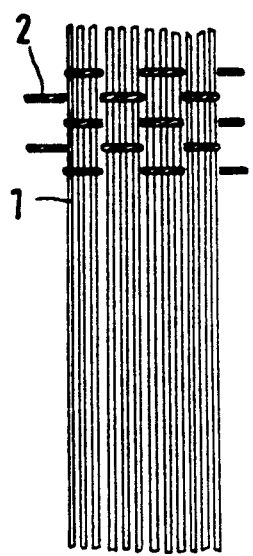
FIG. 1 is an enlarged cutaway plan view of a portion of the web.
Figure 2:
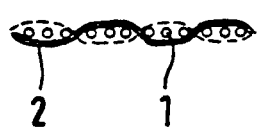
FIG. 2 is a cross section view of the cutaway portion of the web according to FIG. 1.
Figure 3:
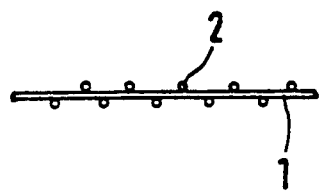
FIG. 3 is a longitudinal cross section view of the cutaway portion of the web according to FIG. 1.

The warp threads 1 and the woof threads 2 shown in FIGS. 1-3 each consist of polyester multiple thread yarn, the number of filaments per thread, in the case of the warp threads 1, amounting to 400 and, in the case of the woof threads 2, amounting to 72. Due to heat treatment, the woof threads 2 are slightly shrunk, preferably in the range of up to 10 percent so that their breaking elasticity will be 18 percent, as compared to 11 percent with the warp threads 1. The yarn strength of the warp threads 1 is approximately at $700 \cdot 10^3 N \cdot m./kg.$ (8 g./den) and that of the woof threads 2 is approximately at $320 \cdot 10^3 N \cdot m./kg.$ (3.6 g./den). The number of warp threads 1 per 10 cm. amounts to 3 times 66 and that of the woof threads 2 amounts to 81. The size of the warp threads 1 is at 223 g./km. and that of the woof threads 2 is at 129 g./km. Thus, a substance per unit area of 444 g./square meter for the warp threads 1 and of 129 g./square meter for the woof threads 2 will result, i.e., the proportion of the warp threads 1 will amount to about 77 percent and that of the woof threads 2 will amount to about 23 percent of the total weight.

As is shown in FIGS. 1-3, the web is structured in such a manner that, between every two crossing points of two adjacent woof threads 2, as viewed in longitudinal direction of the warp threads 1 (FIG. 2), three warp threads 1 are placed, whereas the woof threads 2 are placed over and under the warp threads 1 in an alternating manner. As can be drawn from FIGS. 2 and 3, the result thereof is that the warp threads are substantially linear, whereas the woof threads 2 are passed around the warp threads 1 and, therefore, are wavy. Resulting therefrom is an incorporation of the warp threads 1 of about 0.5 percent and an incorporation of the woof threads 2 of about 23 percent.

For the web thus produced, a strength of 4.62 kN./50 mm. and a stretching ability of 13 percent in the direction of the warp threads 1 are finally obtained with a strip test, whereas, in the direction of the woof threads 2, the strength amounts to 0.77 kN./50 mm. and the stretching ability amounts to 44 percent. The strength in the direction of warp, therefore, is about six times as great as that in the direction of woof, whereas, on the other hand, stretching ability in the direction of woof is about 3.4 times larger than in the direction of warp.

Figure 4:
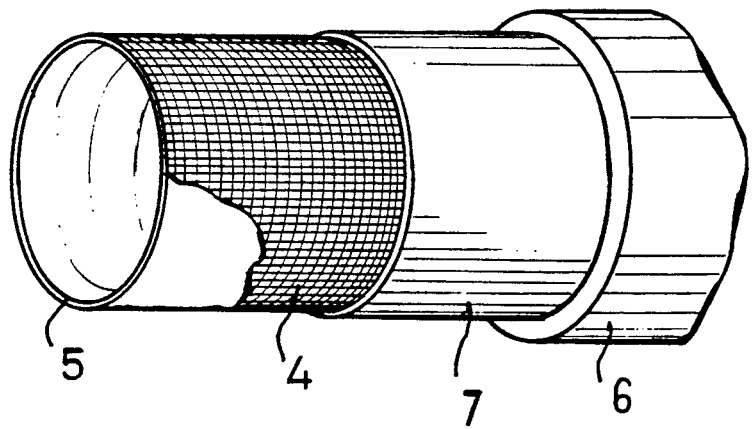
FIG. 4 is a perspective view of the hose of the present invention mounted in a pipe line.

On that side which represents the inner side of the lining, the web 4 is provided with a dense coating of a thermoplastic material 5, such as polyurethane, for the medium to be transported in a pipe line 6, as shown in FIG. 4. Only about half of the thermoplastic material 5 penetrates into the web 4, in order that cement 7 applied onto the other side has, in its turn, the possibility of forming a firm connection with the web 4.

The hose, as described, is suited for gas distribution networks with an internal pressure of up to 3 bars. The pressure for turning-up and introducing the hose into the pipe line 6 as well as the stretching and contact pressure until setting of the cement are below 2 bars. The hose can, however, also be used for higher pipe line pressures, e.g., water pipe lines with an internal pressure of up to 6 bars, in which case it is given a reinforced construction.

We claim:

1. A hose for lining pressure pipe lines, comprising:
   a web being made up of warp and woof threads, the warp and woof threads being made of plastic;
   a coating of thermoplastic material, impermeable to the medium to be transported in the pipe liens, applied onto one side of the web;
   a cement, initially in the interior of the hose, disposed between the outside of the hose and the inside wall of the pipe line when the hose, due to the pressure of a fluid, is introduced into a pipe line and turned up therewith, the cement, in a set condition, tightly holding the hose to the pipe line; and
   the stretching ability of the web, in a transverse direction of the hose, being greater by at least one third as compared to that in its longitudinal direction.

2. The hose according to claim 1, characterized in that the stretching ability of the web, in the transverse direction of the hose, is at least twice as great as in its longitudinal direction.

3. The hose according to claim 1, characterized in that, in the web, the proportion of the warp threads is >65 percent by weight and the proportion of the woof threads is <35 percent by weight.

4. The hose according to claim 1, characterized in that the warp threads are smooth and the woof threads are slightly textured.

5. The hose according to claim 1, characterized in that incorporation for the warp threads is <2 percent and for the woof threads is >12 percent.

6. The hose according to claim 1, characterized in that the tensile strength of the warp threads is at least $500 \cdot 10^3 N \cdot m./kg.$ (5.6 g.den) and the tensile strength of the woof threads is a maximum of $442 \cdot 10^3 N \cdot m./kg.$ (5 g.den).

7. The hose according to claim 1, characterized in that the woof threads are each placed over and under the warp threads in an alternating manner.

8. The hose according to claim 7, characterized in that, between the crossing points of each two adjacent woof threads, two or more warp threads are placed.

9. The hose according to claim 1, characterized in that the warp and woof threads are made of polyester.

10. The hose according to claim 1, characterized in that the coating is made of polyurethane.

11. The hose according to claim 1, characterized in that approximately half of the coating penetrates into the web.

12. The hose according to claim 2 characterized in that, in the web, the proportion of the warp threads is >65 percent by weight and the proportion of the woof threads is <35 percent by weight.

* * * * *